United States Patent

[11] 3,571,798

[72] Inventors Glenn E. Dawson
Cherry Hill, N.J.;
Michael Teig, Yonkers, N.Y.

[21] Appl. No. 775,364
[22] Filed Nov. 13, 1968
[45] Patented Mar. 23, 1971
[73] Assignee International Business Machines Corporation Armonk, N.J.

[54] TWO LEVEL SWITCHING SYSTEM
8 Claims, 10 Drawing Figs.

[52] U.S. Cl. .......... 340/147, 178/3, 178/50, 179/15, 179/18.3
[51] Int. Cl. .......... H04q 3/64
[50] Field of Search .......... 178/2, 3, 50; 179/2 (DP), 18.3, 15; 340/172.5, 147

[56] References Cited

UNITED STATES PATENTS

| | | | |
|---|---|---|---|
| 3,299,210 | 1/1967 | Bandy .......... | 179/2 |
| 3,300,758 | 1/1967 | Hawley .......... | 340/147 |

*Primary Examiner*—John W. Caldwell
*Assistant Examiner*—R. J. Mooney
*Attorneys*—Hanifin and Jancin and Edward M. Suden

ABSTRACT: A two level switching system to be used in communications systems, comprising a first means for placing a plurality of input lines in a Hold Mode of operation, a second means for maintaining a plurality of input lines in an Operating Mode of operation, and means for connecting and disconnecting input lines in an Operating Mode of operation into a Hold Mode of operation at the initiation of the user or of the system itself.

INVENTORS
GLENN E. DAWSON
MICHAEL TEIG

BY Edward M. Seeley
AGENT

TWO LEVEL SWITCHING SYSTEM

BACKGROUND OF THE INVENTION

1. Field of the Invention

The field of the invention relates to communications systems employing connecting means for connecting *m* input lines to *n* output lines. More specifically, the field of the invention relates to a two level switching system which provides an Operating Mode of operation and a Hold Mode of operation.

2. Description of the Prior Art

This invention relates to a two-level switching system which provides an Operating Mode of operation and a Hold Mode of operation. This invention makes more efficient use of the data sets available in any given telecommunications system and therefore makes more efficient use of the business equipment.

FIG. 1 shows the prior art system arrangement for a communications system employing normal telephone facilities. The line search equipment of the telephone company, which may be located at a central office, connects a user to one of the *n* data sets via one of *n* lines which in turn connect the user with the business equipment. In this mode of operation, if all *n* data sets are busy a user cannot enter into the system, that is cannot enter into any communication with the business equipment and its connection environment. It can be readily realized that in this system configuration the user must hold a data set and its associated communication path into the business equipment at all times if he hopes to be in any communication with the business equipment and therefore the data sets are not economically used from the viewpoint of both the user and the business equipment system. The user has to pay for the amount of time he is engaging a data set whether or not he is in actual communication with the business equipment, therefore he is paying in many cases for dead time, that is when no data is being transmitted either from the user to the business equipment or from the business equipment to the user via the data set that he is connected to. From the business equipment standpoint, the tying up of data sets during dead time is not only to make an inefficient use of the data sets but also of the business equipment since the business equipment is limited as to the number of customers that it can be serving by the number of data sets connected to it.

It is therefore an object of this invention to provide a two-level switching system capable of allowing the calling party to control his connection, disconnection and reconnection to the business equipment system.

It is another object of this invention to provide a two-level switching network having the ability to place an active telephone line into a standby status, thus freeing a communications channel and its associated data set into the business equipment system.

It is another object of this invention to provide a two-level switching system having the ability to reconnect a line placed in standby status to any communication channel and identify to the business equipment system the line reconnected.

It is another objective of the invention to provide a two-level switching system capable of holding an incoming call until a communications channel is available.

It is still a further object of the invention to provide a two-level switching system capable of establishing a priority between lines awaiting initial connection to the business equipment system and lines awaiting reconnection to the business equipment system.

SUMMARY OF THE INVENTION

Briefly, the two-level switching system is capable of holding an incoming line in one of two operating modes, an Operating Mode and a Hold Mode. FIG. 2 shows the system configuration of a telecommunication system employing a two-level switching system. The two-level switching system and the *n* data sets form the business equipment system connection environment.

A user dialing in to the business equipment system is connected via the central office line search equipment to the two-level switching system over one of *m* lines. If all *m* lines are busy, then the user will receive a normal busy signal. If however one of the *m* lines is available, then the user will be placed in the Initial Hold. Further, if one of the *n* data sets is available the user will be immediately placed in an Operating Mode and connected to the business equipment via that available data set if it has the highest priority within the two-level switching system. It should be noted that there is communication between the business equipment and the two-level switching system which provides means for the business equipment to control the two-level switching system for connecting and disconnecting lines to the *n* data sets connected to the business equipment. Further, the communication between the business equipment and the two-level switching system provides information to the business equipment such that when a line is reconnected to the business equipment from the two-level switching system it can be properly identified. If the user is connected to one of the *m* inputs to the two-level switching system, but however there are no data sets available at that time, the user will be put into the Initial Hold mode and will await the availability of a data set.

It therefore can be realized that the number of users connected to the business equipment system is no longer dictated by the number of data sets connected to the business equipment but rather by the number of *m* input lines that is capable of being handled by the two-level switching system.

FIG. 3 is a state diagram of the invention and will be used to describe the operation of the invention. As previously stated, if all *m* input lines to the two-level switching system are busy the user will receive a busy signal when he attempts to dial into the business equipment system. Further, if all *n* data sets are busy but not all *m* lines are busy, then the user when he dials into the business equipment system will be accepted by the two-level switching system and placed in an Initial Hold state awaiting the availability of one of the *n* data sets.

For further discussion let it be assumed that all input lines to the two-level switching system are not busy and all *n* data sets to the business equipment are not busy. With reference to the state diagram in FIG. 3, the user when dialing into the business equipment system will be connected over one of the inactive lines of the line in active state. A ring voltage will be sent out over the inactive line which will be connected to one of the *m* positions of the two-level switching system which in turn will generate a call answer and place the line in an Initial Hold state. A line in the Initial Hold state may be inactivated either by a system disconnect signal, or by a user disconnect signal, that is the user hanging up. A line will remain in the Initial Hold state until a data set is available and the line has the required priority to be connected to the available data set. When a line in the Initial Hold state meets the requirements of a data set available and having the correct priority, it will be transferred into an Operation state, that is connected to one of the *n* data sets and put into communication with the business equipment. A line in the Operation state may be returned to an Inactive state by either a system disconnect or a user disconnect signal. Further, a line in the Operation state may be transferred to a System Hold state by either a user hold signal or a system hold signal. A line placed in the System Hold state may again be transferred into the Inactive state by either a system or user disconnect signal. Further, a line in a System Hold state may be transferred to the Operation state by either a system reconnect signal plus proper priority or a user reconnect signal plus proper priority.

It can therefore readily be realized that a given line may be in any one of three states and still be within the business equipment system connection environment. The line may be either in the Initial Hold state, the System Hold state, or in the Operation state. It can further be realized that once a line has been transferred from the Initial Hold state to the Operation state that thereafter the line can be disconnected and reconnected for a plurality of times into the System Hold state either under the direction of the system itself or the user of that particular line.

The use of the two-level switching system within a communication system allows the user to initiate a hold status so that he would not have to pay for time while thinking and still maintain connection with the business equipment connection environment. This would be of importance in any application requiring long periods of connection to a computer such as games, educational courses, vocational guidance, calculators, etc.

Another advantage of the two-level switching system is that the user would, in most cases, not receive a busy signal and have to redial into the business equipment system. This is to say that the user would be put into Initial Hold state and could receive a message such as "the computer is busy, please wait and you will be connected."

Still another advantage of the two-level switching system is that the total system cost could be reduced because a system could be designed for a lower grade of service without affecting users or acceptance. It would basically allow more efficient use of data sets both from a users' cost viewpoint and from a business equipment source of information viewpoint.

Another advantage of the two-level switching system is that it increases reliability of the overall system due to the ability of the business equipment to sense a channel malfunction or undesired level of errors and to switch line connections without breaking connection and without loss of data.

BRIEF DESCRIPTION OF THE DRAWINGS

The foregoing and other objects, features and advantages of the invention will be apparent from the foregoing and more particular description of the preferred embodiment of the invention, as illustrated in the accompanying drawings.

DESCRIPTION OF THE PREFERRED EMBODIMENT

In order to better understand the invention, the preferred embodiment of the invention is shown in the environment of a telecommunications system. This is to say that the two-level switching system will provide connections between *m* input lines from a central office line search equipment to business equipment via *n* data sets. It should be here noted that although telecommunications systems are one of the main environments in which the two-level switching system may be used, it is not to be inferred that the two-level switching system is restricted to use with telecommunication systems but rather can be used with any communications system that requires the connection of *m* input lines to *n* output lines.

Figure 4:
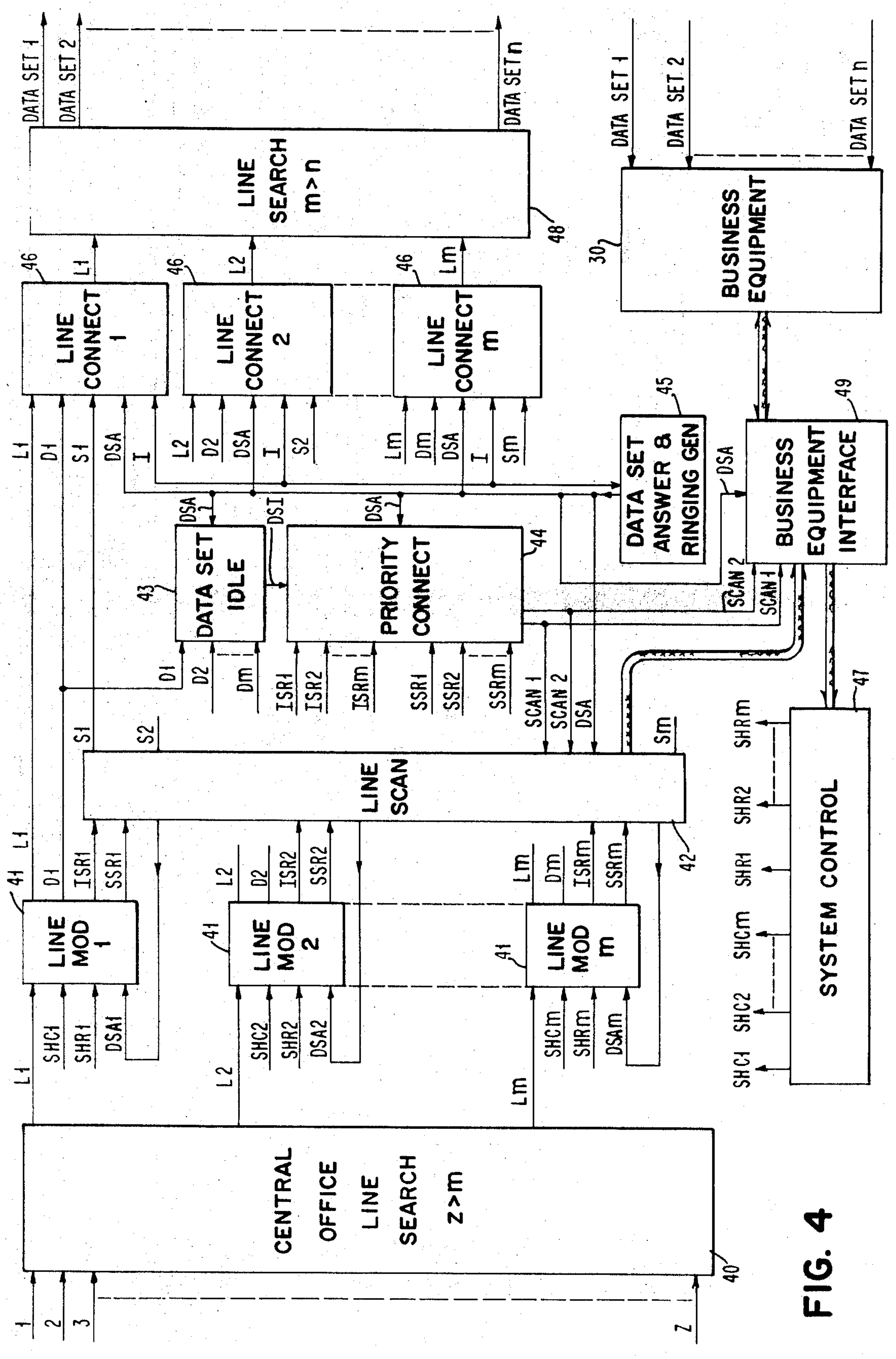
FIG. 4 is a block diagram of the preferred embodiment of the invention of the two-level switching system.

FIG. 4 shows the logic configuration of the preferred embodiment of the two-level switching system in the environment of a telecommunications system.

Table 1 is a list of abbreviations used in a description of the preferred embodiment.

TABLE I.—ABBREVIATIONS [1]

| | |
|---|---|
| L | Line. |
| D | Disconnect. |
| S | Select. |
| I | Interrogate. |
| SHC | System Hold Connect. |
| SHR | System Hold Release. |
| DSA | Data Set Answer. |
| DSI | Data Set Idle. |
| IHC | Initial Hold Connect. |
| ISR | Initial Service Request. |
| SSR | System Service Request. |

[1] Note any numeral following any abbreviation designates the line number associated with the abbreviations.

FIG. 4 shows Z input lines to the central office line search equipment 40 having *m* output lines which constitute the *m* input lines L1—L*m* to the two-level switching network. A line module 41 is associated with each L*line L1—Lm*. Further, a line connect module 46 is associated with each input line L1-—L*m*. The data set answer and ringing generator module 45 provides a ringing current for interrogating if a data set is available and a data set answer current to notify the two-level switching system that a data set has in fact answered. The data set idle module 43 provides means for determining if any data sets are available at any given time. The priority connect module 44 determines whether a System Hold state or in an Initial Hold state has priority. The line scan module 42 provides means for addressing each of the line modules 41 and contains means for determining which one of the *m* line modules 41 should next be connected via line connect module 46 to a data set that is then available according to the priority as dictated by priority connect module 44. The system control module 47 provides a means whereby the business equipment 30 via the business equipment interface 49 may communicate with the *m* line modules 41 within the two-level switching system to connect and reconnect a given line to and from an Operating mode to a System Hold mode.

LINE MODULE

Figure 5:
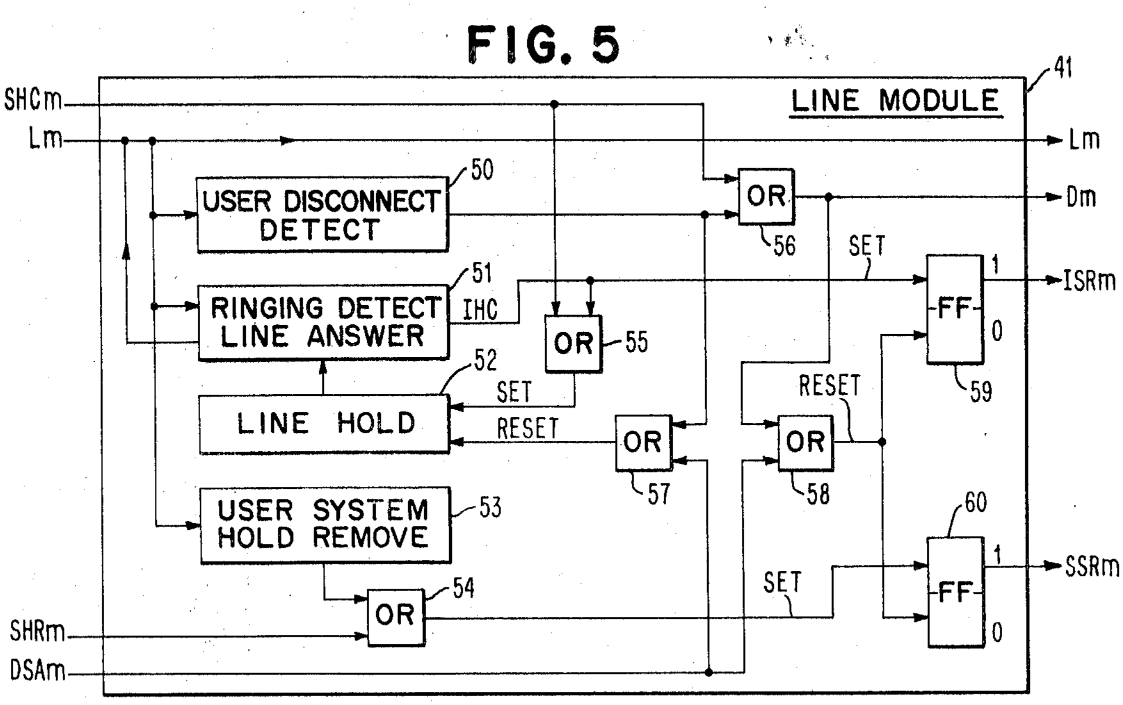
FIG. 5 is a logic diagram of a Line Module used in FIG. 4.

FIG. 5 shows the logic configuration of a line module 41. Line module 41 consists of a user disconnect detect circuit 50, a ring detect and line answer circuit 51, line hold circuit 52, a user system hold remove circuit 53, OR circuits 54, 55, 56, 57, and 58, flip-flop 59 and flip-flop 60.

Line module 41 has four input lines, SHC, L, DSA, and SHR. Input line L is connected to the user disconnect detect circuitry 50, the ringing detect and line answer circuit 51, the user system hold remove circuit 53 and as an output line L*m* from line module 41. The user disconnect detect circuit 50 is standard telephone equipment which recognizes a signal that is generated by the telephone central office when a user hangs up. The ringing detect and line answer circuit 51 is standard telephone circuitry for recognizing a ringing voltage, connecting line module 41 to the input line and for providing a line answer current back to the central office. The line hold circuit 52 is used to maintain the connection between the central office and the line module 41 when line L is not connected through a line connect circuit 46 via a line search circuit 48 to a data set. The user system hold remove circuit 53 is standard telephone circuitry for recognizing a signal generated by the user by means of parallel tone, switch hook flasher, etc., which would generate a request that the System Hold mode be removed and the line module be replaced into a Operating mode.

The line module has four output lines L, D, ISR, and SSR. The output of OR circuit 56 is the disconnect line D. OR circuit 56 has two inputs SHC and the output from the user disconnects detect circuit 50. The output of flip-flop 59 is the ISR line. Flip-flop 59 is set by the IHC line from the ringing detect and line answer circuit 51 and is reset by the output from OR circuit 58. The output of flip-flop 60 is the SSR line which is set by the output of OR circuit 54. The inputs to OR circuit 54 are the output of the user system hold remove circuit 53 and the SHR input line. Flip-flops 59 and 60 are reset by the output of OR circuit 58. The inputs to OR circuit 58 are the output line D or OR circuit 56 and the DSA input line. Line hold circuit 52 is set by the output of OR circuit 55 and reset by the output of OR circuit 57. The inputs to OR circuit 55 are the IHC output line of the ring detect and line answer circuit 51 and the SHC input line. The input to OR circuit 57 is the output of the user disconnect detect circuit 50 and the DSA input line.

LINE SCAN

Figure 6:
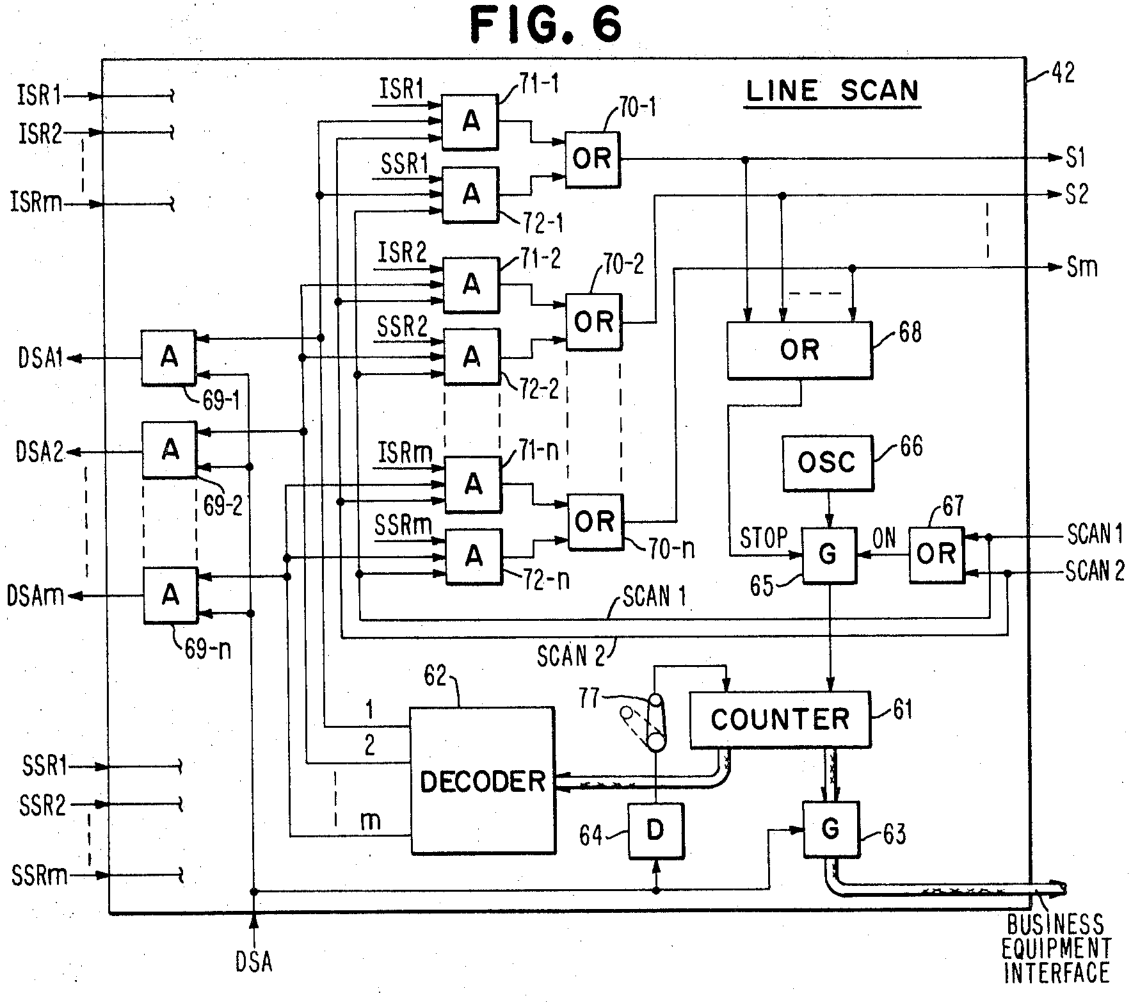
FIG. 6 is a logic diagram of the Line Scan Module used in FIG. 4.

FIG. 6 is a logic diagram of the line scan module. The purpose of the line scan module is to make a priority scan of the *m* line modules 41 to determine which module should next be connected to the next available data set. Line scan module 42 is comprised of an oscillator 66 whose output is gated via gate 65 to counter 61. Gate 65 is stopped by an output appearing on the output line of OR circuit 68 and started by an output appearing on the output of OR circuit 67. The output of counter 61 is decoded by decoder 62. Each output line of the decoder 62 is an input to one AND circuit in each set of AND circuits 69, 71, and 72. The contents of the counter are transferred to the business equipment interface 49 via a set of gates 63.

The line scan module has as its inputs one ISR line for each line module 41, one SSR line for each line module 41, a Scan 1 and Scan 2 line from priority circuit 4 and a DSA line from data set answer and ringing generator circuit 45. The DSA input line to line scan module 42 conditions one leg of a set of two legged AND gates 69. The output from the set of AND gates 69 is a plurality of lines having the DSA input line addressed by the contents of counter 61. The DSA input line also is used to transfer the contents of the gate 63 to the business equipment interface 49.

Scan 1 and Scan 2 input lines are inputs to OR circuit 67 with controls of the opening of gate circuit 65. Scan 1 input line is also connected to one leg of each AND circuit 72–1 to 72–*m* of the set of AND circuits 72. Scan 2 input line is also connected to each AND circuit 71–1 to 71–*m* of the set of AN circuits 71.

The set of AND gates 71 determines when there is coincidence between the output of decoder 62, a Scan 2 condition and an ISR input from one of the line modules 41. The set of AND circuits 72 provides an output when there is coincidence between the output of decoder 62, a Scan 1 condition and a output from SSR line from the line modules 41. The outputs from the sets of AND circuits 71 and 72 are OR'ed together in a set of OR circuits 70. The output of each OR circuit 70–1 to 70–*m* is a line S associated with each of the line modules 41.

Means is shown within the line scan 42 for changing the method of scanning the three sets of AND circuits 69, 71, and 72. A delay circuit 64 is connected via switch 77 as a reset input to counter 61. If the switch 77 is closed every time a DSA signal arrives on the DSA input line to the line scan module 42 a signal will be generated after a delay as dictated by delay 64 to reset the counter 61. In this mode of operation it can be seen that the counter will always start with an 0 and count upward. Thus, those line modules 41 having a lower number associated with them in the line scan module 42 will have a higher priority. That is line module 1 will always have priority over all the other line modules in both a scan 1 or a scan 2 mode of operation. If however, switch 77 is open then the counter is not reset but will continue counting whenever gate 65 is reopened. In this mode of operation the line search is random and no line module 41 can be said to have any priority over any other line module 41 since the position of the counter 61 at any given time is unpredictable.

Data Set Idle Module

The data set idle module 43 is used to generate a signal whenever a data set is not available. The data set idle module 43 contains an up-down counter 80, a decoder 81 and an inverter 82. The output of the data set idle module 43 is taken from the output of inverter 82, which is line DSI. The input to the count up side of counter 80 is the DSA input line. The input to the countdown side of counter 80 is the output of OR circuit 83 which has as its inputs the D input lines.

Priority Connect Module

Priority connect module 44 is used to determine the relative priority of Scan 1 and Scan 2. The priority connect module 44 consists of OR circuits 85 and 86, switch 84, inverters 87 and 88 and AND circuits 89 and 90. The ISR lines from the line modules 41 are OR'ed together by OR circuit 85. The SSR lines from the line modules 41 are OR'ed together by OR circuit 86. AND circuit 89 has as its inputs the output of OR circuit 85, the output of inverter 87 and the DSI line. AND circuit 90 has as its inputs the output of OR circuit 86, the output of inverter 88 and the DSI line. AND circuits 89 and 90 are interlocked such that only one of the two AND circuits 89 or 90 may be activated at any given instant of time. Switch 84 determines which of the two OR circuits 85 or 86 has priority over the other. This is to say that if the switch 84 is in the position shown in FIG. 8, any output of OR circuit 86 will prevent AND circuit 89 from being activated. The opposite is true when switch 84 is shown in the other position, then an output from OR circuit 85 will prevent AND circuit 90 from being activated. In this method, the relative priority of Scan 1 and Scan 2 is determined. It should be noted that although switch 84 is shown to be a manual switch this need not be the case and that switch 84 may be a relay that is controllable from the computer system itself.

The output of the priority connect module 44 is Scan 1 and Scan 2 lines. The Scan 2 line is the output of AND circuit 89 and the Scan 1 line is the output of AND circuit 90.

Line Connect Module

The line connect module 46 is used to connect the line L from the line module 41 to the line search equipment 48. The line connect module 46 contains two latch relays 91 and 92. A signal on line S sets both latch relays 91 and 92. With latch relays 91 and 92 both set, line I from the data set answer and ringing generator circuitry 45 is connected into the line search equipment 48. The DSA line resets latch 92 upon a data set answer signal being generated from data set answer and ringing generator module 45. Latch relay 91 is reset when a signal appears on line D.

System Control Module

The system control module is used to generate commands to the two-level switching circuit from the business equipment 30 via the business equipment interface 49. The system control module 47 contains a command generator 93, an address decoder 94, a set of the AND circuits 95 and a set of the AND circuits 96. The command generator has two outputs. The first output line SHR is connected to each AND circuit of the set of AND circuits 95. The second output line SHC from command generator 93 is connected to each AND circuit of the set of AND circuits 96. The address generator 94 has *m* outputs, each output line being associated with one AND circuit in each set of AND circuits 95 and 96. The system control module 47 has as its output a plurality of address command lines (SHC1 to SHC*m*, SHR1 to SHR*m*).

Data Set Answer and Ringing Generator Module

The data set answer and ringing generator module 45 is standard telephone circuitry for providing a ringing current to interrogate the availability of receivers and to provide an answer current when one of the receivers is connected.

Line Search Modules

The line search module 48 is standard line search equipment found in use in telephone communications systems.

Business Equipment Interface Module

The business equipment interface module 49 is comprised of a plurality of buffers and gates for transmitting information from and to the two-level switching system to the business equipment 30. Interface modules built with standard techniques allow all types of business equipment to be used.

OPERATION OF THE INVENTION

Let it first be assumed that the initial conditions of the business equipment system are that all *m* line modules 41 are available and all *n* data sets are available.

With reference to FIG. 4, when a user dials into the business equipment system the central office line search equipment 40 will connect the user via L1 to line module 1. With reference to FIG. 5, the ringing detect and line answer circuitry 51 of line module 1 will detect the ringing current on line 1 and produce an output on line IHC. The output of the ringing detect and line answer circuitry 51 sets flip-flop 59 and conditions OR 55 such that the line hold circuitry 52 is set. The line hold circuitry 52 provides a line answer signal to the central office by line L1 at this time. An initial service request signal is generated on the ISR output line of line module 1, which is the output of flip-flop 59.

Figure 8:
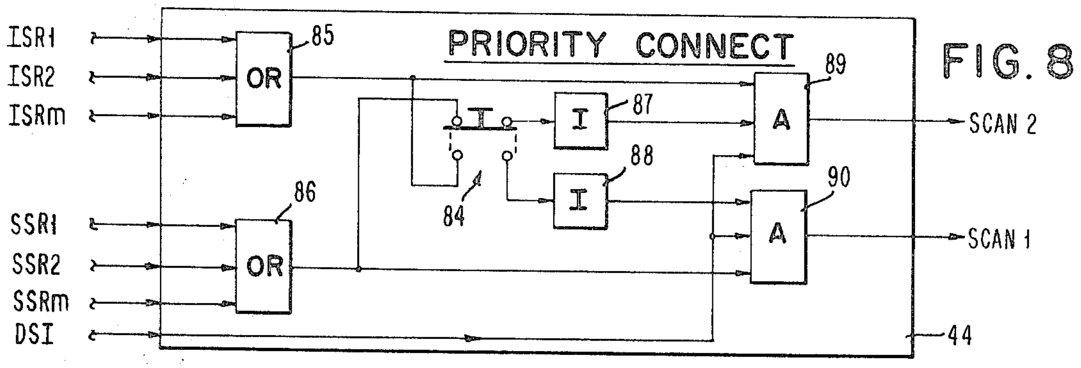
FIG. 8 is a logic diagram of the Priority Connect Module as shown in FIG. 4.

As can be seen from FIG. 4, the line ISR 1 is connected to the line scan module 42 and to the priority connect module 44. With reference to FIG. 8, the initial service request signal appearing on the ISR 1 line activates OR circuit 85 which activates one input of AND circuit 89 of the priority connect module 44. Assume switch 84 is in the position shown in FIG. 8. Further, since all other line modules 41 are available no other service request signals will be present either on the ISR lines or the SSR lines. With all the SSR lines inactive OR circuit 86 will be inactive, this will be transmitted to inverter circuit 87 via switch 84 which will condition a second input of AND circuit 89. Further, since all data sets are available the output of the data set idle module 43 will be activated such that the third input to AND circuit 89 will be up and AND circuit 89 will therefore be activated.

Figure 7:
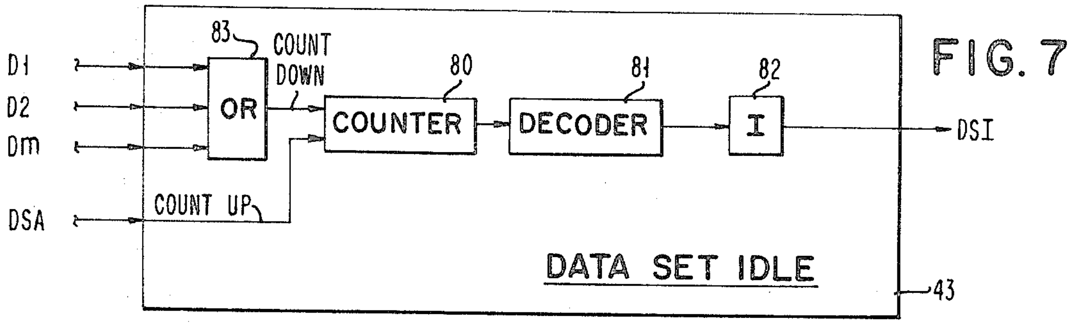
FIG. 7 is a logic diagram of the Data Set Idle Module used in FIG. 4.

With reference to FIG. 7, the data set idle module 43 will count up every time a data set answer signal is available on the DSA line and will count down every time a disconnect signal is sensed on any of the D lines from the line modules 41. The decoder 81 senses the output of counter 80 and provides an output signal when the counter reaches a number that would indicate that all data sets are being used. This signal is inverted by inverter 82 and transmitted on output line DSI of data set idle module 43. Therefore, the output of data set idle module 43 is normally activated except when all data sets are being used.

Returning to FIG. 8, it can be seen that AND circuit 89 is now activated which activates the Scan 2 output line of priority connect circuit 44. With reference to FIG. 6, Scan 1 and Scan 2 lines are connected to the line scan module 42. The Scan 2 line being activated will conduct one input of each of the AND circuits in the set of AND circuits 71. It should be also noted that the initial search request signal on ISR1 has also conditioned a second input of AND circuit 71–1 of the set of AND circuits 71. Scan 1 and Scan 2 lines are OR'ed together by OR circuit 67 which controls the gate 65. With the Scan 2 line activated, gate 65 is turned on allowing pulses from oscillator 66 to step counter 61. Decoder 62 decodes the count of 61. Let it here be assumed that the counter 61 was initially at zero such that the first pulse from oscillator 66 via gate 65 step counter 61 to a count of 1. This would activate output line 1 of decoder 62 which in turn would activate an input of two AND circuits 71–1 and 72–1, one AND circuit being in both of the set of AND circuits 71 and 72. AND circuit 71–1 of the set of AND circuits 71 having all its inputs conditioned, will be activated. The output of AND circuit 71–1 is fed through OR circuit 70–1 through OR circuit 68 to close the gates 65 which controls the stepping of counter 61. It should be noted that the frequency of oscillator 66 is such as to allow the circuitry to respond, thus gate 65 is closed before another pulse will be counted by counter 61, having counter 61 with the count of 1 stored in it. The output line S1 of the OR circuit 70–1 of the set of OR circuits 70 is activated. It should also be noted at this time that the AND circuit 69–1 of the set of AND circuits 69 also has one of its inputs conditioned by means of signal appearing on the output line 1 of decoder 62.

Figure 9:
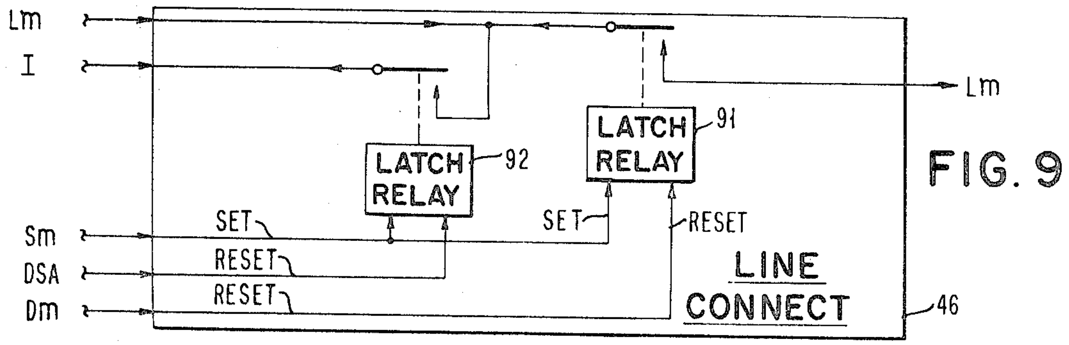
FIG. 9 is a logic diagram of a Line Connect Module as shown in FIG. 4.

With reference to FIG. 9, the positive output on the line S1 will set latch relays 91 and 92 of the line connect 1 module. With latch relays 91 and 92 set, relay points associated with each latch relay are closed allowing the data set answer and ringing generator 45 to pass a ringing current on line 1 through line connect module 1 to line L1 which is connected to the line search equipment 48. Let it be assumed that data set 1 is connected by the line search equipment 48 to line L1. This condition will be sensed over line I by the data set answer and ringing generator 45 which in turn will generate a data set answer signal on line DSA. A data set answer signal by line DSA reset latch 92 in line connect module 1 as can be seen in FIG. 9, steps the counter 80 in the idle module 43 up 1 count as can be seen in FIG. 7, and enters the line scan module 42.

In FIG. 6, the data set answer signal on the DSA input line to the line of scan module 42 will first transfer the count in counter 61 via gates 63 to the business equipment interface 49. The data set answer signal will, after some time delay as dictated by delay line 64, reset counter 61 to zero via switch 77. Finally the data set answer signal will condition one input of each AND circuit 69–1 to 69–*m* of the set of AND circuits 69. The output line DSA1 of AND circuit 69–1 of the set of AND circuits 69 will be activated.

With reference to FIG. 5, the line DSA 1 is an input to line module 1 on the input line DSA 1. The data system answer signal on line DSA 1 will pass through OR circuit 58 and reset flip-flop 59 which will remove the initial service request signal on line ISR 1 of line module 1. The data system answer signal on the line DSA 1 will also pass through OR circuit 57 and reset the line hold circuitry 52 in line module 1. It should here be noted that the need to have line hold circuitry 52 set has terminated since via the contact of latch relay 91 in line connect module 1 through the line search equipment 48 to data set 1 which is supplying the complete closed path required for proper connection.

When the initial service request signal on line ISR 1 is removed AND circuit 89 of the priority connect produce 44 is shown in FIG. 8 and will be deactivated causing the Scan 2 line to be deactivated. Further, as can be seen in FIG. 6, the removal of the initial service request on line ISR 1 will deactivate AND circuit 71–1 of the set of AND circuits 71 removing the output signal on the line S1. In turn the stop signal to gate 65 from OR circuit 68 will be removed but however since neither line Scan 1 or Scan 2 to OR circuit 67 is activated, gate 65 remains closed and counter 61 is not stepped.

It should be remembered that the latch relay 91 in line connect 1 module once set will remain set until a reset signal is applied and therefore line 1 remains connected to data set 1 even though the signal on line S1 has been removed.

With reference to FIG. 4, the count of the counter 61 has been transferred via gate 63 to the business equipment interface 49. The business equipment interface also has stored within it the type of scan associated with the address stored. The data system answer signal also enters the business equipment interface as a timing pulse for transferring to the business equipment 30 the address of the line module and the type of scan. This information tells the business equipment 30 whether the line module being connected was generated from an initial service request (Scan 2) or by a system service request (Scan 1).

Figure 1:
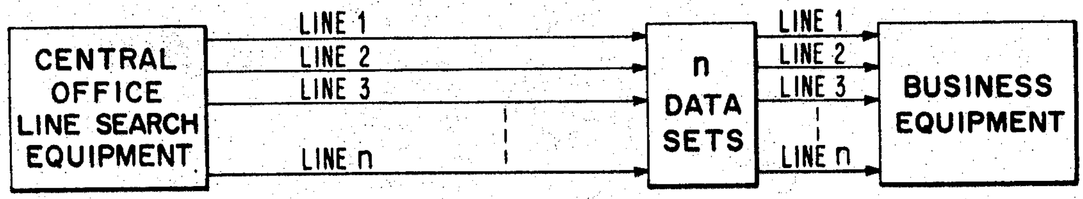
FIG. 1 (PRIOR ART)
FIG. 1 shows the prior art system configuration of a communications system.
Figure 2:
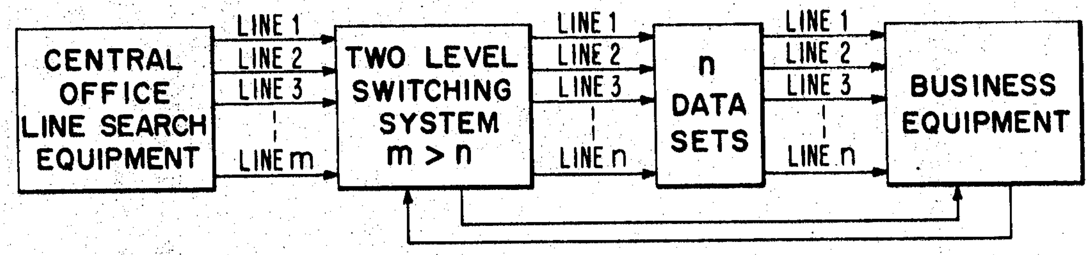
FIG. 2 shows the system configuration of a communications system employing a two-level switching system.
Figure 3:
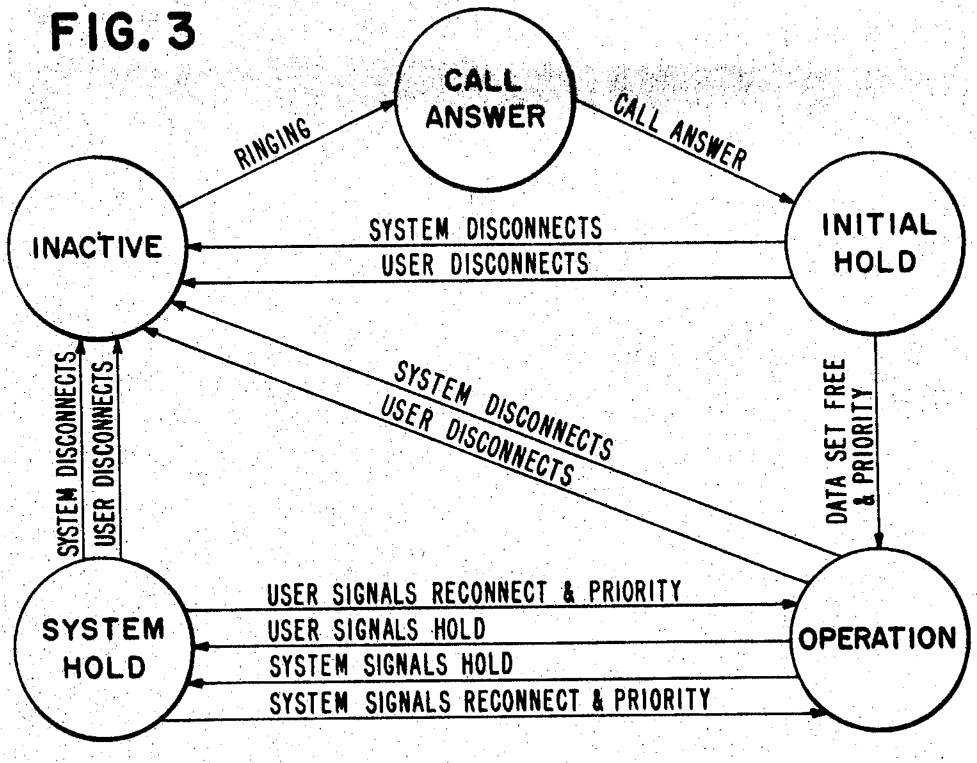
FIG. 3 is a state diagram of the operation of the two-level switching system.

At this point it should be realized that the line module 1 is in an Operation state as shown in FIG. 3. The line module 1 was in the Initial Hold state for a period of time that the initial service request signal was present on line ISR 1. It can here be realized that if in fact all data sets had been busy then the line DSI from data set idle module 43 would have been deactivated which in turn would have prevented the Scan 1 and Scan 2 lines of priority connect module 44 from being activated and this in turn would have prevented output line S1 of line scan module 42 from being activated. Without the line S1 being activated the latch relays in line connect module 1 would not have been set and line 1 would not have been connected to line search equipment 48. Line module 1 would then have remained in the Initial Hold state until a data set became available which generates a sequence of steps previously described to connect the line module 1 to the available data set.

Returning to our initial set of conditions, that is line L1 being connected via line module 1 and line connect module 1 to line search equipment 48 to data set 1, it will not be shown how a user may establish a disconnect from the data set but still remain connected to the business equipment system.

That is in the business equipment system the user sends into the business equipment 30 a signal over line L1 connection environment which is recognized by the business equipment 30 as a request for the line L1 to be placed in a Systems Hold state. It should here be realized that this System Hold mode could be generated by the business equipment itself as a matter of programming and the procedure for obtaining a Systems Hold mode is the same whether initiated by a signal generated by the user or by a signal generated by the program within the business equipment 30.

Figure 10:
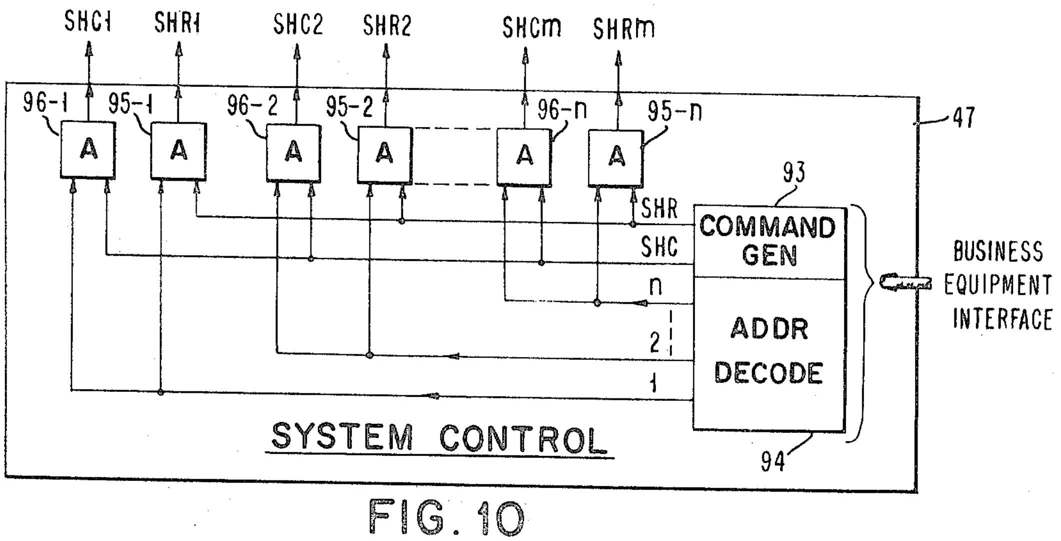
FIG. 10 shows the logic diagram for the System Control Module as used in FIG. 4.

The business equipment 30 transfers the address of the line module requesting a Systems Hold mode and a systems hold connect command via the business equipment interface 49 to the system control 47. With reference to FIG. 10, the system hold connect command is generated by command generator 93 which conditions one input of each of the AND circuits 96–1 to 96–*m* of the set of AND circuits 96. The address decoder 94 decodes the address and conditions the proper AND circuits associated with that address in both sets of AND circuits 95 and 96. In our given example since we are using line module 1, AND circuit 96–1, whose output line is SHC 1, will be activated.

Now returning to FIG. 5, a system hold connect signal appearing on line SHC 1 passes through OR circuit 55 and sets the line hold circuit 52 which completes the circuit to the central office via line L1. The system hold connect signal also passes through OR circuit 56 and exits line module 1 as a disconnect signal on line D1. The disconnect signal on line D1 will step down counter 80 in the data set idle module 43 as seen in FIG. 7 and will reset latch relay 91 in line connect module 1 as seen in FIG. 9. With latch relay 91 reset, line L1 is disconnected from data set 1 which is therefore free to service another line module 41. It should here be noted that line module 1 is not disconnected from the business equipment system since line 1 still appears to be connected by means of line hold circuitry 52 in line module 1.

Now let us assume that after a given period of time the user connected to line L1 desires to be reconnected to business equipment 30. Here the user generates a signal by means of a parallel tone, switch hook flasher, etc., and transmits it via line L1 to line module 1. This signal is detected by the user's system hold remove circuits 53 in line module 1 which generates a signal equivalent to a system hold remove signal. It can here be realized that a line module 41 may be reconnected to the system at the discretion of the business equipment 30. When the business equipment reaches a decision to reconnect a specific line module, the business equipment generates the address of the line module to be reconnected and a system hold remove command. The address and the command is transferred from the business equipment 30 via the business equipment interface modules 49 to the system control module 47. As previously described, a system hold remove signal will be generated for the proper line module which is desired to be reconnected to the business equipment. In one example, the business equipment 30 would transfer information to generate a system hold remove signal on line SHR 1 of the system control module 47. The line SHR 1 is OR'ed together with the output of the user system hold remove circuit 53 by OR circuit 54. The output of OR circuit 54 of line module 1 will therefore be a system hold remove signal generated either by the user via the system hold remove circuit 53 or a system hold remove signal generated by the system control module 47. The system hold remove signal passing through OR circuit 54 will set the flip-flop 60 in line module 1. A system service request will therefore be generated on the output of flip-flop 60 which is line SSR 1.

With reference to FIG. 8, a system service request signal on line SSR 1 will activate OR circuit 86 in priority connect module 44. With OR circuit 86 activated AND circuit 89 is deactivated by means of switch 84 and inverter 87. It therefore can be realized that a system service request signal has priority over an initial service request signal. If there had been any initial service request signals to OR circuit 85, AND 89 could not be activated since one of its inputs is deactivated. If switch 84 was in its alternate position, then an initial service request would override any system service request in a similar manner as previously described.

The activation of OR circuit 86 activates one leg of AND circuit 90 and with switch 84 in its present position the output of inverter 88 activates a second input of AND circuit 90. The third output of AND circuit 90 will be activated when there is a data set idle signal of line DSI. As previously described this can only occur when a data set is available and therefore if no data sets are available the system will remain in the System Hold mode until a data set is available. Assuming that a data set is available and a data set idle signal is on line DSI and the AND circuit 90 will be activated generating a signal on line Scan 1.

With reference to FIG. 6, with line Scan 1 activated, gate 65 will step counter 61 in a similar manner when line Scan 2 was activated as previously described. Line Scan 1 also activates one input in each AND circuit 72–1 to 72–*m* of the set of AND circuits 72. A system service request signal is present on line SSR 1 which activates an input to AND circuit 72–1 in the set of AND circuits 72.

The oscillator 66 will pass pulses through gate 65 to counter 61. Let it further be assumed for the sake of discussion that switch 77 of line scan module 42 is open such that the counter 61 is not reset with every data system available signal which appears on line DSA. In a scan 2 type of operation any line module 41 having a system service request will be serviced before a line module 41 which generates an initial service request. For the sake of this discussion, let it be assumed that only line module 1 is generating a system service request. Under these conditions, the counter 61 will count until it reaches the count of 1. With the counter 61 at a count of 1 the output line 1 of decoder 62 will be activated causing AND circuit 72–1 in the set of the AND circuits 72 to be activated.

The output of OR circuit 70–1, via OR circuit 68, closes gate 65 which prevents counter 61 from being stepped. AND circuit 69–1 of the set of AND circuits 69 will have one input conditioned by output line 1 of decoder 62.

As previously described, a signal on line S1 sets latch relays 91 and 92 in line connect module 1, which in turn connects line L1 to line circuit equipment 48. The data set answer and ring generator module 45 is connected via line I through the line connect module 1 on line L1 to line search equipment 48. Once again a line search is performed by the line search equipment 48 until an available data set is connected to line connect module 1. When this occurs the data set answer and ring generator module 45 senses the condition on line L1 and generates a data set answer signal on line DSA.

The data set answer signal on line DSA resets latch relay line 92 in line connect module 1, counts up counter 80 in data set module 43, transfers the contents of counter 61 via gates 63 in line scan module 42 and the type of scan through the business equipment interface 49 to business equipment 30 and conditions one input in each of the AND circuits in the set of AND circuits 69. The data set answer signal will condition AND circuit 69–1 such that a signal is generated on line DSA 1.

With reference to FIG. 5, a data set answer signal on line DSA 1 of line module 1 will reset flip-flop 60 via OR circuit 58, will remove the system service request signal from line SSR 1 and will reset line hold circuitry 52 via OR circuit 57.

With the termination of the system service request signal on line SSR 1, AND circuit 90 in priority connect module 44 will be deactivated and the signal on the line Scan 1 will be terminated. Also the termination of the system service request signal on line SSR 1 will deactivate AND circuit 72–1 of the set of AND circuits 72 which removes the signal from line S1 and from the stop line to gate 65.

At this time the line module 1 has gone from a System Hold mode to an Operating mode and line module 1 has been reconnected to the business equipment 30.

When a user is either in an Initial Hold mode, an Operation mode, or a System Hold mode he may disconnect from the system whenever he chooses. The user disconnects simply by hanging up the receiver, this is sensed by the central office line search equipment 40 which in turn generates a signal that is sensed by the user disconnect detect circuit 50 in line module 1. The output from the user disconnect detect circuit 50 resets the line hold circuit 52 via OR circuit 57, resets flip-flops 59 and 60 and exits line module 1 as a disconnect signal on line D1. The disconnect signal on line D1 will step down the counter 80 in the data set idle module 43 and will reset latch relay 91 in line connect module 46.

It can be readily realized that a user is placed into an Initial Hold mode until he is initially connected to the business equipment, at that time he enters into an Operating mode. Once a user has entered into an Operating mode, he may be connected and reconnected into a System Hold mode without being disconnected from the overall system. The system has the flexibility of allowing either the user to initiate a System Hold connect or a disconnect. This can be most useful in applications in which a time for response is limited such that the business equipment may communicate to the user that his time for response has elapsed.

While the invention has been particularly shown and described with reference to a preferred embodiment thereof, it will be understood by those skilled in the art that various changes in form and detail may be made therein without departing from the spirit and scope of the invention.

I claim:

1. A two-level switching system comprising;
- *m* input lines;
- *n* output lines, where *m* is greater than *n;*
- a holding means capable of holding each of said *m* input lines;
- a first connecting means for connecting any of said *m* input lines to said holding means;
- a second connecting means for individually connecting any number *p* of said *m* input lines to any of individual ones of number *p* of said *n* output lines where the maximum value of *p* is *n;*
- a first transfer means for transferring any of said *m* input lines being held by said holding means to said second connecting means, said second connecting means connecting the input lines transferred thereto to individual ones of said output lines;
- a second transfer means for transferring any of said *m* input lines connected to said *n* output lines by said second connecting means to said first connecting means, said first connecting means connecting the input lines transferred thereto to said holding means; and
- a control means for controlling the transferring of said *m* input lines by said first transfer means and by said second transfer means.

2. A two-level switching system as set forth in claim 1 further including a priority means for determining the relative priority of said *m* input lines being held by said holding means.

3. A two-level switching system as set forth in claim 1, further comprising;
- a business equipment means being connected to at least one of said *n* output lines; and
- an interface means for connecting said business equipment means to said control means.

4. A two-level switching system as set forth in claim 2, further comprising:
- a business equipment means being connected to at least one of said *n* output lines; and
- an interface means for connecting said business equipment means to said control means.

5. A two-level switching system as set forth in claims 1, 2, 3, or 4, wherein said holding means comprises:
- a first holding means for holding each of said *m* input lines prior to being transferred by said first transfer means to said second connecting means; and
- a second holding means for holding each of said *m* input lines being transferred by said second transfer means.

6. A two-level switching system as set forth in claims 2 or 4, wherein said priority means comprises:
- a first priority means for determining the relative priority between said first holding means and said second holding means;
- a second priority means for determining the relative priority between said *m* input lines in said first holding means; and
- a third priority means for determining the relative priority between said *m* input lines in said second holding means.

7. A two-level switching system as set forth in claim 5, wherein said control means comprises:
- a detecting means for determining the availability of each of said *n* output lines; and
- an initiating means for initiating the transfer of said *m* input lines being held by said holding means, said initiating means being responsive to a plurality of sources of commands.

8. A two-level switching system as set forth in claim 7 wherein said business equipment means is one of said plurality of sources of commands to said initiating means of said control means.